(12) United States Patent
Lütgenau et al.

(10) Patent No.: US 9,482,264 B2
(45) Date of Patent: Nov. 1, 2016

(54) TOLERANCE COMPENSATION APPARATUS

(71) Applicant: WITTE Automotive GmbH, Velbert (DE)

(72) Inventors: Frank Lütgenau, Gevelsberg (DE); Klaus Spickenheier, Iserlohn (DE)

(73) Assignee: WITTE AUTOMOTIVE GMBH, Velbert (DE)

( * ) Notice: Subject to any disclaimer, the term of this patent is extended or adjusted under 35 U.S.C. 154(b) by 0 days.

(21) Appl. No.: 14/179,756

(22) Filed: Feb. 13, 2014

(65) Prior Publication Data

US 2014/0234054 A1 Aug. 21, 2014

(30) Foreign Application Priority Data

Feb. 18, 2013 (DE) .......................... 10 2013 202 582

(51) Int. Cl.
*F16B 43/00* (2006.01)
*F16B 5/02* (2006.01)

(52) U.S. Cl.
CPC ........... *F16B 43/009* (2013.01); *F16B 5/0233* (2013.01); *F16B 5/0283* (2013.01)

(58) Field of Classification Search
CPC .............................. F16B 5/0233; F16B 5/025
USPC .................................................. 411/546, 535
See application file for complete search history.

(56) References Cited

U.S. PATENT DOCUMENTS

| | | | |
|---|---|---|---|
| 574,582 A * | 1/1897 | Smith ........................... 411/315 |
| 811,035 A * | 1/1906 | Chidester ..................... 411/535 |
| 1,507,481 A * | 9/1924 | Harris ........................... 411/294 |
| 1,758,503 A * | 5/1930 | Distler et al. ................... 24/105 |
| 5,106,225 A * | 4/1992 | Andre et al. ............... 403/408.1 |
| 5,340,258 A * | 8/1994 | Simon ........................... 411/535 |
| 5,375,953 A | 12/1994 | Krug et al. |
| 6,666,615 B2 * | 12/2003 | Mukouyama et al. .... 403/374.4 |
| 2007/0009342 A1* | 1/2007 | Figge et al. ................... 411/546 |

FOREIGN PATENT DOCUMENTS

| | | |
|---|---|---|
| CN | 1074280 A | 7/1993 |
| DE | 19949654 A1 | 4/2001 |
| DE | 20204994 U1 | 7/2002 |
| DE | 102007002699 A1 | 7/2008 |
| DE | 102009016239 A1 | 11/2010 |

OTHER PUBLICATIONS

English Translation of German Search Report for Related German Patent Application No. 10 2013 202 582.3, dated Nov. 27, 2013, 6 pages.
German Search Report for Related German Patent Application No. 10 2013 202 582.3, dated Nov. 27, 2013, 5 pages.
Official Communication from Patent Office in China; dated Jun. 22, 2016; 6 pages.

* cited by examiner

*Primary Examiner* — Flemming Saether
(74) *Attorney, Agent, or Firm* — Cantor Colburn LLP (57) ABSTRACT

The invention relates to an apparatus for the compensation of tolerances between components to be screwed to one another, comprising a hollow-cylindrical base element and a hollow-cylindrical compensation element which is in threaded engagement with the base element and which can be moved from a starting position into a compensation position by rotation relative to the base element. The apparatus is characterized in that a fixing means is provided by which the compensation element can be fixed in the compensation position relative to the base element.

10 Claims, 8 Drawing Sheets

TOLERANCE COMPENSATION APPARATUS

The present invention relates to an apparatus for the compensation of tolerances between components to be screwed to one another, comprising a hollow-cylindrical base element and a hollow-cylindrical compensation element which is in threaded engagement with the base element and which can be moved from a starting position into a compensation position by rotation relative to the base element.

Such a tolerance compensation apparatus is generally known and is used, for example, in automobile construction, in particular when it is a question of screwing two components to one another across a joining gap subject to tolerances. The tolerance compensation apparatus is for this purpose arranged between the components to be connected and a screw element for screwing the components together, e.g. a screw or a threaded bolt, is led through correspondingly provided openings in the components and through the tolerance compensation apparatus. On the screw connection of the screw element, the compensation element is rotated relative to the base element via a drive spring connected between the screw element and the compensation element and is thereby moved axially to the base element out of its starting position, e.g. is moved out of the base element, until it reaches its compensation position in which the base element and the compensation element each contact one of the components and thus bridge the joining gap.

Known tolerance compensation apparatus of the above type have proved to be of disadvantage to the extent that the compensation element is again moved back out of its compensation position in the direction of its starting position on a release of the screw element due to the drive spring, e.g. again moves into the base element. This is in partiuclar unwanted in such applications which require a very exact adjustment of components which are to be screwed to one another and which should be replaceable, e.g. headlamps of a motor vehicle, since an adjustment of the compensation element from its compensation position makes a repeat adjustment of the components necessary after a removal of a component.

It is an object of the present invention to provide a tolerance compensation apparatus which allows a release of the screw connection of the components without the compensation element losing its compensation position in so doing.

The object is satisfied by an apparatus having the features of claim 1 and in particular in that a fixing means is provided by which the compensation element can be fixed relative to the base element in the compensation position.

The fixing means in other words prevents the compensation element from being able to leave its compensation position on a release of the screw connection of the components and from being able to return into its starting position, e.g. from being able to move into the base element. On a removal of one of the components, the compensation element and the base element therefore maintain their relative position whereby it is ensured that the components are separated from one another by a joining gap which is just as wide as before on a subsequent new screw connection of the components.

The tolerance compensation apparatus in accordance with the invention is thus particularly suitable, for example, for the installation of a headlamp into a motor vehicle since, in the case of a removal of the headlamp and a subsequent reinstallation thereof or of a different headlamp, no new alignment or new adjustment of the headlamp is necessary.

Advantageous embodiments of the invention can be found in the dependent claims, in the description and in the drawings.

In accordance with an embodiment, the fixing means is configured to secure the compensation element against a rotation relative to the base element. The compensation element can hereby not move into the base element and a compensation position is maintained once it has been reached.

In accordance with a further embodiment, the fixing means fixes the compensation element relative to the base element by means of a connection with material continuity and/or friction locking. The fixing means can, for example, effect a clamping and/or adhesive bonding of the compensation element in its compensation position.

The fixing means is preferably movable out of its position of rest into a fixing position. The advantage thereby results that a fitter can determine when the compensation element is fixed in the compensation position. The compensation element can thus, for example, be moved out of the base element and back in several times during an installation process until an ideal compensation position is found. The fixing means can subsequently be moved from the position of rest into the fixing position to prevent a further moving of the compensation element into and out of the base element.

In accordance with a particularly advantageous embodiment, the fixing means comprises at least one fixing wedge which is in clamping engagement with the compensation element in the fixing position. The fixing means can be configured as wedge shaped at least regionally so that a friction resistance arising at the compensation element becomes the larger, the closer the fixing means comes to the fixing position. It is understood that the resulting friction moment has to be larger than a drive moment exerted by a screw element of the apparatus in order reliably to suppress a rotation and/or movement of the compensation element relative to the base element.

The fixing means preferably comprises two fixing wedges which are arranged parallel to one another such that they are in clamping engagement with the compensation element at oppositely disposed sides of the compensation element in the fixing position. An even more reliable clamping of the compensation element is achieved by this symmetrical arrangement of the fixing wedges. In addition, on the movement of the fixing wedges into the fixing position, no torque is produced which acts on the compensation element. The compensation element consequently exactly maintains its compensation position on a displacement of the fixing wedges.

In accordance with a further preferred embodiment, the fixing wedges are connected to one another by a connection element which in particular extends at right angles to the fixing wedges and/or which is in particular configured in one piece with the fixing wedges. The connection element thus makes it possible to move both fixing wedges simultaneously and synchronously.

If the fixing parts and the connection element are configured in one piece, they can moreover be manufactured simply and inexpensively, for example as an injection molding.

The at least one fixing part is further preferably displaceably arranged in a fixing housing which is attached to the base element. The fixing housing thus forms a guide for the at least one fixing wedge. The fixing housing is advantageously rotationally fixedly connected to the base element.

In accordance with a further embodiment, securing means are provided for securing the fixing means in the fixing position. The securing means thus prevents an unintentional removal of the fixing means from the fixing position.

The at least one fixing wedge preferably has a toothed arrangement and the fixing housing has a latch projection which engages into the toothed arrangement to secure the fixing wedge in the fixing position. The fixing wedge is thus also blocked in the fixing position and cannot be removed from the fixing position when, for example, the screw element extending through the tolerance compensation apparatus is released and a force acts on the fixing wedge from the compensation element and urges the fixing wedge from the fixing position. In addition, an unintentional release of the fixing wedge due to vibrations above all frequently occurring in the automotive sector is actively prevented.

In accordance with an alternative embodiment, the fixing means comprises a toothed arrangement which is formed peripherally at an outer wall of the compensation element and into which a latch projection connected to the base element engages. The toothed arrangement can in this respect be designed such that a rotation of the compensation element is only possible in one direction, namely when the compensation element is moved into the compensation position. A rotation back of the compensation element from the compensation position into the starting position is prevented in contrast. Two latch projections are preferably provided which resiliently engage into the toothed arrangement of the compensation element at oppositely disposed sides of the compensation element.

In accordance with a further alternative embodiment, the fixing means comprises an adhesive which is provided between the base element and the compensation element. The adhesive can, for example, be introduced between the hollow-cylindrical base element and the hollow-cylindrical compensation element in the radial direction.

The adhesive is preferably arranged between threadless sections of the base element and of the compensation element in the starting position of the compensation element.

The adhesive can advantageously be introduced into a thread connecting the compensation element and the base element by a movement of the compensation element into its compensation position. After a certain hardening time, the adhesive in the thread can bring about material continuity between the compensation element and the base element and can thus fix the compensation element relative to the base element.

In accordance with an embodiment, the adhesive is a two-component adhesive whose components are separated as long as the compensation element is located in its starting position and which mix when the compensation element is moved into its compensation position.

Each component of the adhesive can, for example, be present in separate microcapsules. If the compensation element is moved, the microcapsules are broken open and the components of the adhesive can mix with one another.

Alternatively, the two components of the adhesive can be arranged adjacent or, viewed in the peripheral direction of the apparatus, alternately between the base element and the compensation element and can be mixed with one another by rotation of the compensation element relative to the base element in order subsequently to harden.

The invention will be described in the following purely by way of example with reference to possible embodiments and to the enclosed drawings. There are shown.

Figure 1:
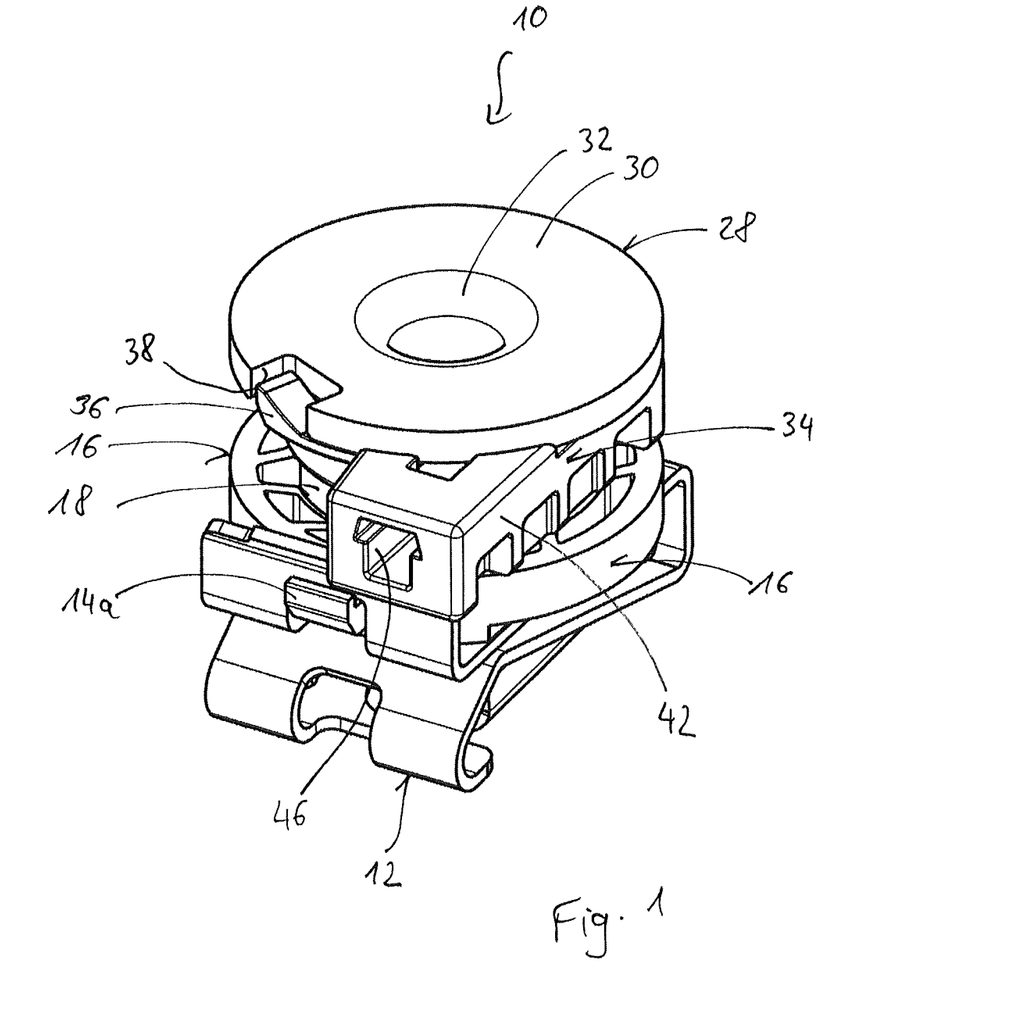
FIG. 1 a tolerance compensation apparatus in accordance with a first embodiment of the invention in a perspective view from above.

A first embodiment of a tolerance compensation apparatus 10 for compensating tolerances between a first component (not shown) and a second component (not shown) is shown in FIG. 1.

The tolerance compensation apparatus 10 comprises a snap-in nut 12 which is produced from spring steel and by means of which the tolerance compensation apparatus 10 can be fastened to the first component. In the embodiment shown, the snap-in nut 12 is located at a lower side of the tolerance compensation apparatus 10. The snap-in nut 12 comprises a nut element (not shown) for screwing to a screw element, e.g. a screw or a threaded bolt, extending through the tolerance compensation apparatus 10.

Figure 2:
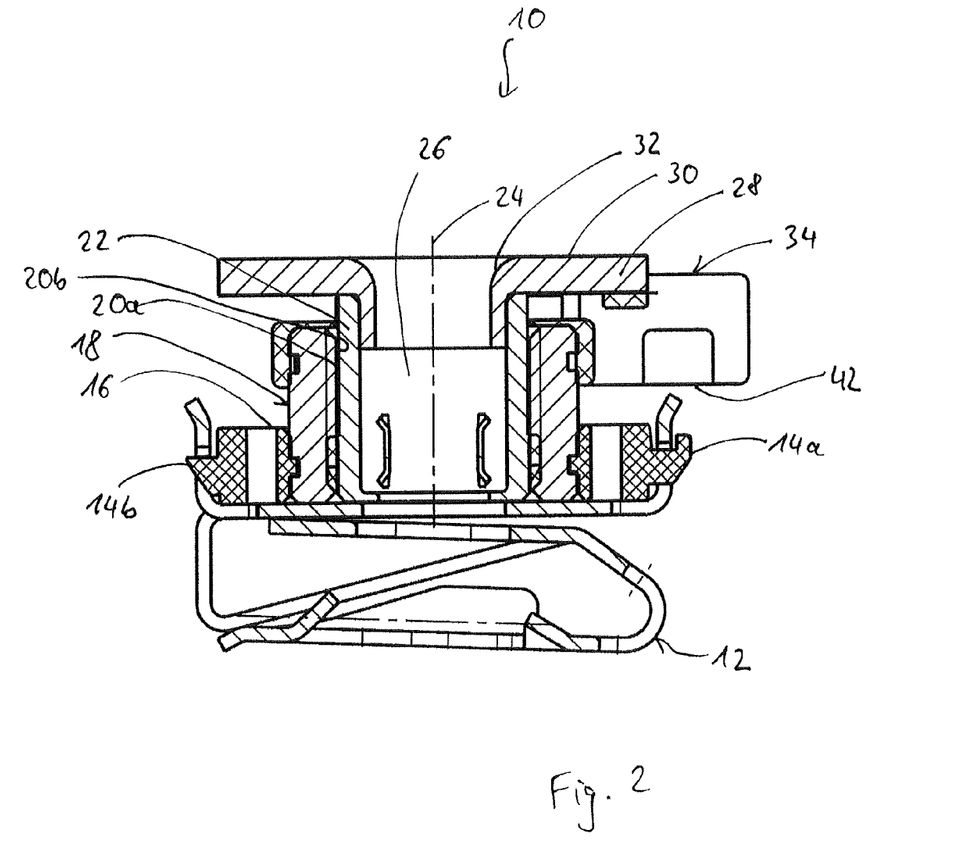
FIG. 2 the tolerance compensation apparatus of FIG. 1 in a lateral sectional view.

The snap-in nut 12 is hung in at two fastening hooks 14a, 14b (FIG. 2) which are molded to a fastening ring 16 of the tolerance compensation apparatus 10 (FIG. 1). The fastening ring 16 is fixedly connected to a base element 18 which is hollow-cylindrical and which has an internal thread 20a at its inner side. The internal thread 20a has an orientation opposite to the thread of the screw element; it is a left-hand thread in the present embodiment.

A likewise hollow-cylindrical compensation element 22 extends into the base element 18. The compensation element 22 has an external thread 20b at its outer side which is in engagement with the internal thread 20a of the base element 18. The compensation element 22 can be moved by rotation relative to the base element 18 along a central longitudinal axis 24, i.e. it can be screwed out of or into the base element 18.

A drive spring 26 is arranged in the compensation element 22; the drive spring is supported at the inner side of the compensation element 22 and is in frictional engagement with the screw element led through the tolerance compensation apparatus 10 to transmit a torque exerted by the screw element onto the compensation element 22.

A contact ring 28 is provided at an upper side of the tolerance compensation apparatus 10 remote from the snap-in nut 12; it is fastened to the compensation element 22 by means of a press fit and serves to support the tolerance compensation apparatus 10 against the second component. The contact ring 28 for this purpose defines a planar contact surface 30 which extends perpendicular to the central longitudinal axis 24 and also defines a central passage 32 for the screw element.

A fixing housing 34 is located beneath the contact ring 28 and is fixedly attached to the base element 18, e.g. latched and/or adhesively bonded to the base element 18.

A resilient securing lug 36 is formed at the fixing housing 34 and engages into a cut-out 38 of the contact ring 28 in a starting position of the compensation element 22 to prevent an unintentional rotation of the compensation element 22. A rotation of the compensation element 22 out of the base element 18 is thus only possible when the securing lug 36 is pressed away downwardly out of the cut-out 38 by the contact ring 28. The securing lug 36 and the cut-out 38 of the contact ring 28 in this manner form a transport security for the tolerance compensation apparatus 10.

The tolerance compensation apparatus 10 is arranged between the components to screw them together and the screw element is led from above through an opening of the second component, the tolerance compensation apparatus 10 and an opening of the first component. In this respect, the screw element moves into engagement with the drive spring 26 which is arranged in the compensation element 22.

If the screw element is rotated for a screw connection of the components, to the right in the present embodiment, a torque is transmitted by the drive spring 26 to the compensation element 22 which effects a rotation of the compensation element 22 relative to the base element 18, whereby the compensation element 22 is moved along the central longitudinal axis 24 upwardly out of the base element 18.

As soon as the compensation element 22 has been moved so far out of the base element 18 that the contact ring 28 contacts the second component, the friction moment between the second component and the contact ring 28 exceeds the torque which can be transmitted by the drive spring 26 and the compensation element 22 is not further rotated out of the base element 18. The compensation element 22 has thus adopted a position which is called a compensation position here.

Figure 3A:
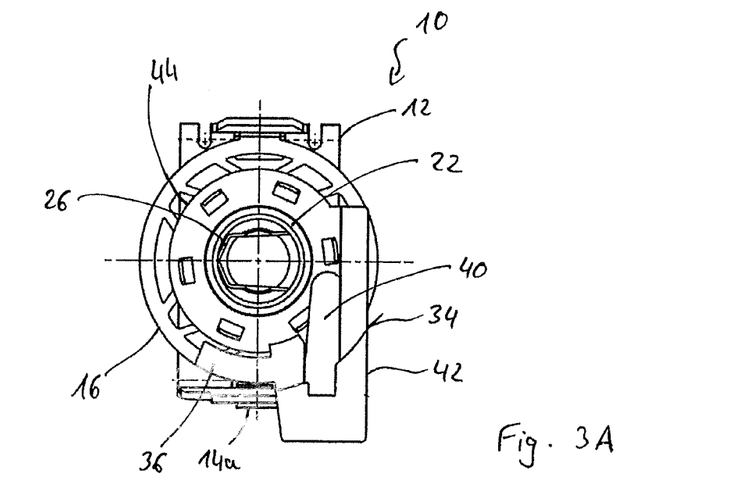
FIG. 3A the tolerance compensation apparatus of FIG. 1 without a contact ring in a plan view with a fixing means in a position of rest.
Figure 3B:
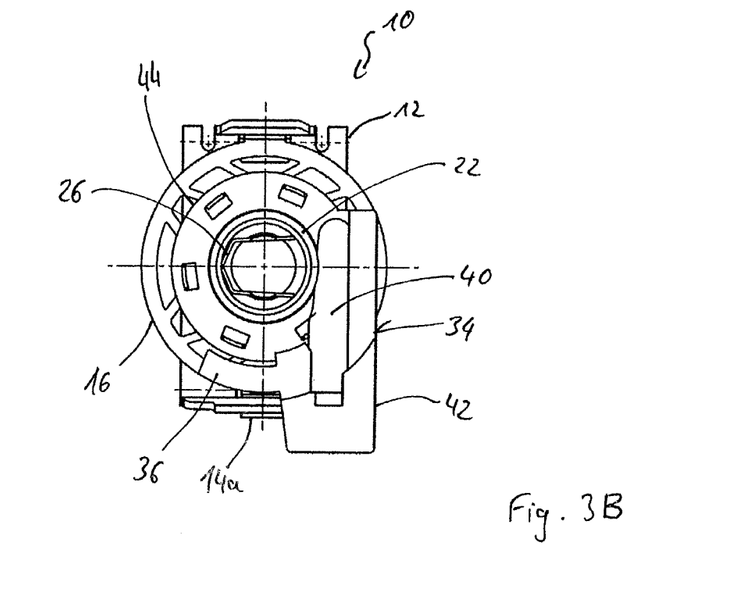
FIG. 3B the tolerance compensation apparatus of FIG. 1 without a contact ring in a plan view with a fixing means in a fixing position.
Figure 4:
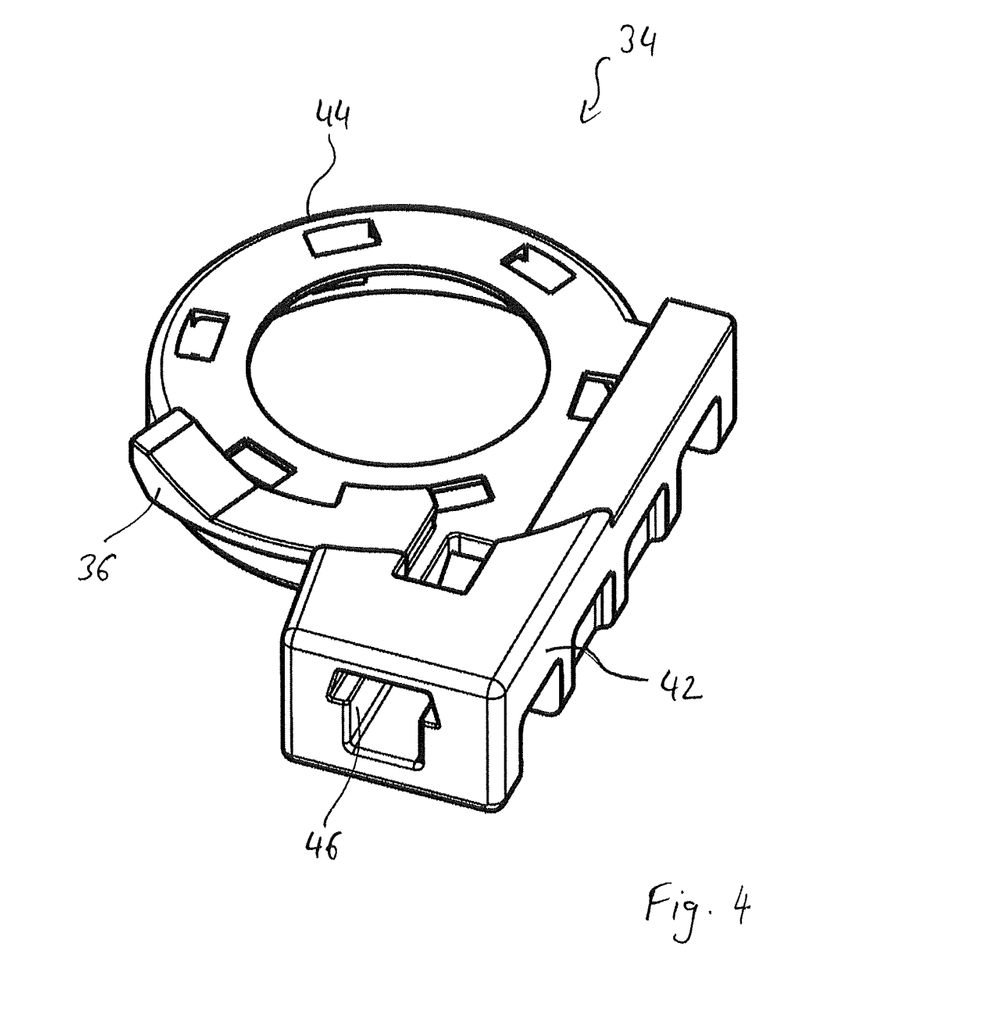
FIG. 4 a fixing housing in a perspective view from above.

To fix the compensation element 22 in its compensation position, the tolerance compensation apparatus 10 comprises a fixing wedge 40 (FIG. 5) which is supported in the fixing housing 34 (FIGS. 3 and 4). The fixing housing 34 comprises a guide section 42 extending tangential to the outer side of the compensation element 22 for guiding the fixing wedge 40. The fixing housing 34 furthermore has a ring-shaped section 44 via which the fixing housing 34 is fixedly connected to the base element 18.

If the compensation element 22 has adopted its compensation position, the fixing wedge 40 is pushed from a position of rest shown in FIG. 3A into a fixing position shown in FIG. 3B by means of a tool which is introduced through an opening 46 into the fixing housing 34.

Figure 5A:
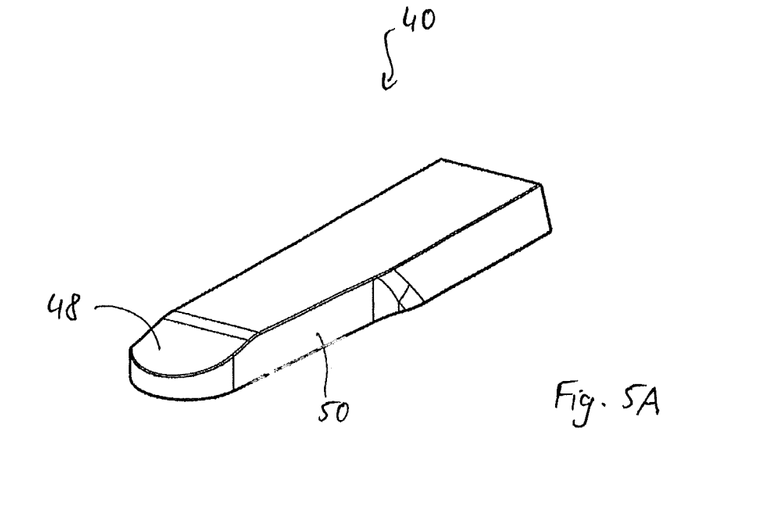
FIG. 5A a fixing wedge in a perspective view from above.
Figure 5B:
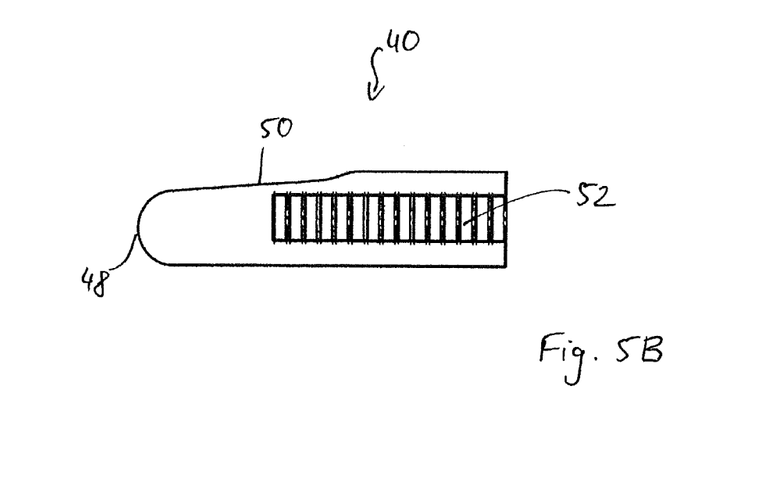
FIG. 5B a fixing wedge in a plan view from below.

The fixing wedge 40 shown more exactly in FIG. 5 is of elongate shape and has a substantially rectangular cross-section. The fixing wedge 40 tapers toward a front end 48, whereby a wedge-shaped section 50 is formed. The fixing wedge 40 has a toothed arrangement 52 at its lower side.

If the fixing wedge 40 is pushed into the fixing position shown in FIG. 3B, the wedge-shaped section 50 is brought into clamping engagement with the compensation element 22 and a rotation of the compensation element 22 is made more difficult. The further the fixing wedge 40 is pushed into the fixing housing 34, the stronger the clamping effect of the fixing wedge 40. If the friction moment between the fixing wedge 40 and the compensation element 22 exceeds the torque of the screw element which can be transferred by the drive spring 26, the compensation element 22 is fixed in its compensation position even on a dismantling of the screw element.

The fixing housing 34 has a latch projection (not shown) in the guide section 42 which latch projection engages into the toothed arrangement 52 of the fixing wedge 40 and at least makes a movement of the fixing wedge 40 from the fixing position back into the position of rest more difficult in order in this way to prevent an unintentional release of the fixing wedge 40 from the fixing position.

Figure 6A:
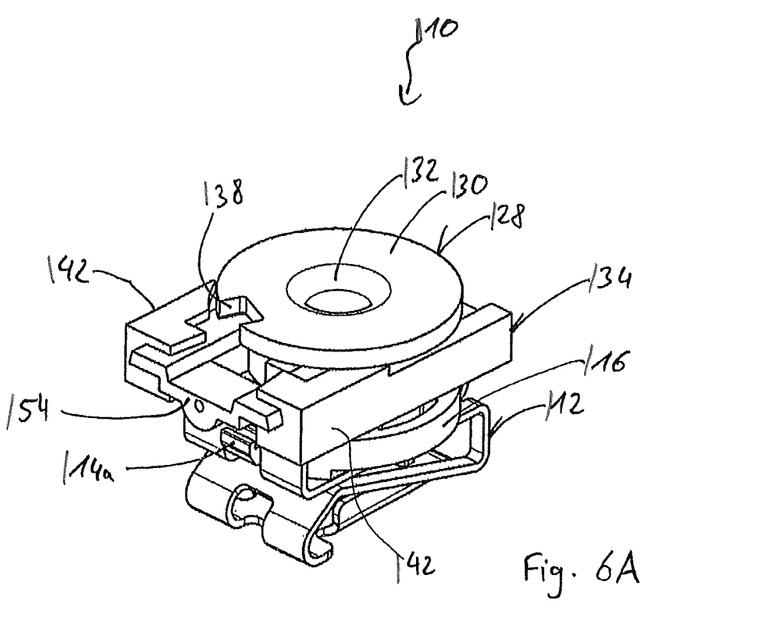
FIG. 6A a tolerance compensation apparatus in accordance with a second embodiment of the invention in a perspective view from above.
Figure 6B:
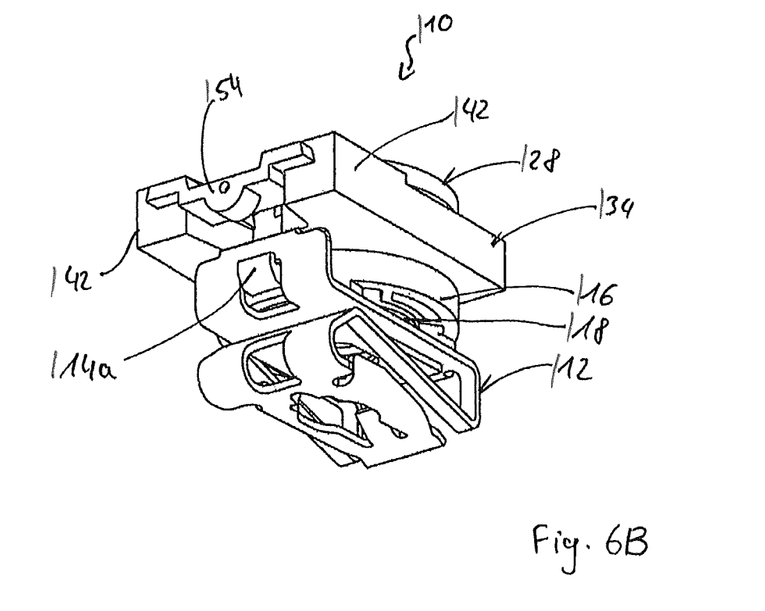
FIG. 6B a tolerance compensation apparatus in accordance with a second embodiment of the invention in a perspective view from below.

A second embodiment of a tolerance compensation apparatus 110 is shown in FIG. 6. It essentially differs from the first embodiment only in that two fixing wedges 140 are provided which engage at the compensation element 122 at oppositely disposed sides thereof.

The fixing wedges 140 are connected to one another by a connection element 154 which extends at a right angle to the fixing wedges 140 and is formed in one piece with them. The two fixing wedges 140 are guided in a fixing housing 134 which has two guide sections 142. The fixing housing 134 comprises a substantially parallelepiped-shaped outer contour.

If the compensation element 122 is to be fixed in its compensation position, the fixing wedges 140 are brought into clamping engagement with the compensation element 122 by pressure on the connection element 154 simultaneously on oppositely disposed sides of the compensation element 122. In a similar manner as with the first embodiment, the fixing housing 134 has latch projections in the guide sections 142 which latch projections engage into the toothed arrangements 152 of the fixing wedges 140 and hold them in the fixing position.

Figure 7:
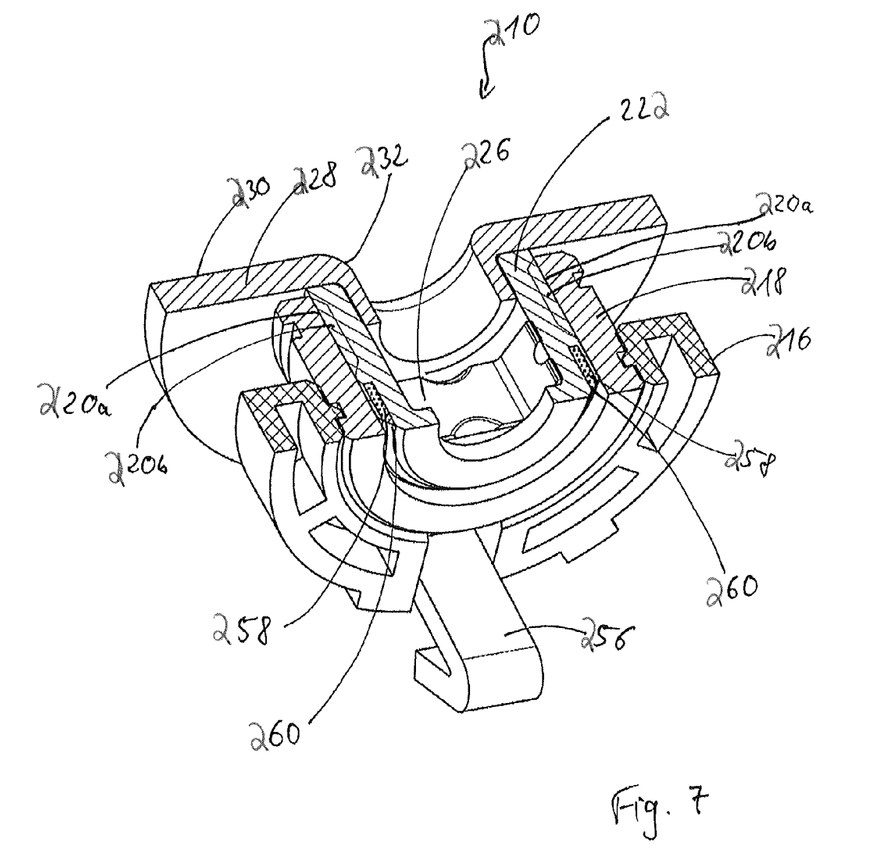
FIG. 7 a tolerance compensation apparatus in accordance with a third embodiment of the invention in a perspective sectional view from below.

A third embodiment of a tolerance compensation apparatus 210 is shown in FIG. 7.

Unlike the embodiments described above, the embodiment of FIG. 7 comprises, instead of the snap-in nut 212, two latching clips 256 for fixing the tolerance compensation apparatus 210 to the first component which project from the fastening ring 216 and of which only one is shown.

In a further difference, the third embodiment does not have any fixing housing 234 or any fixing wedge 240. Instead, a two-component adhesive 258 packed in microcapsules is provided between the compensation element 222 and the base element 218 for securing the compensation element 222 in its compensation position. As long as the compensation element 222 is in its starting position, the adhesive 258 is arranged in a ring gap 260 between the compensation element 222 and the base element 218 which is defined by thread-less lower regions of the compensation element 222 and of the base element 218.

Figure 8A:
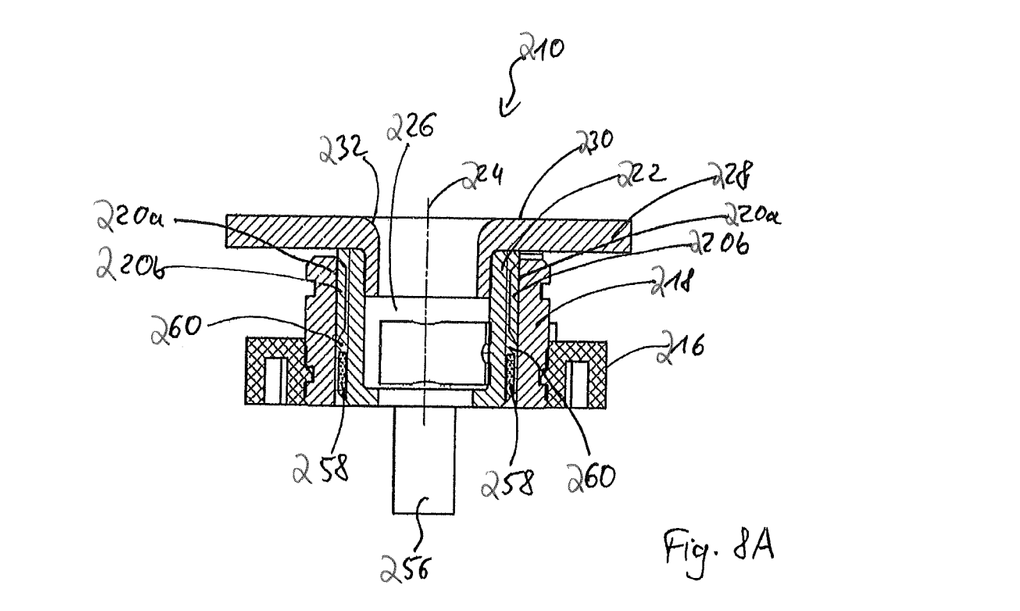
FIG. 8A a side sectional view of the tolerance compensation apparatus of FIG. 7 with a compensation element in the starting position.
Figure 8B:
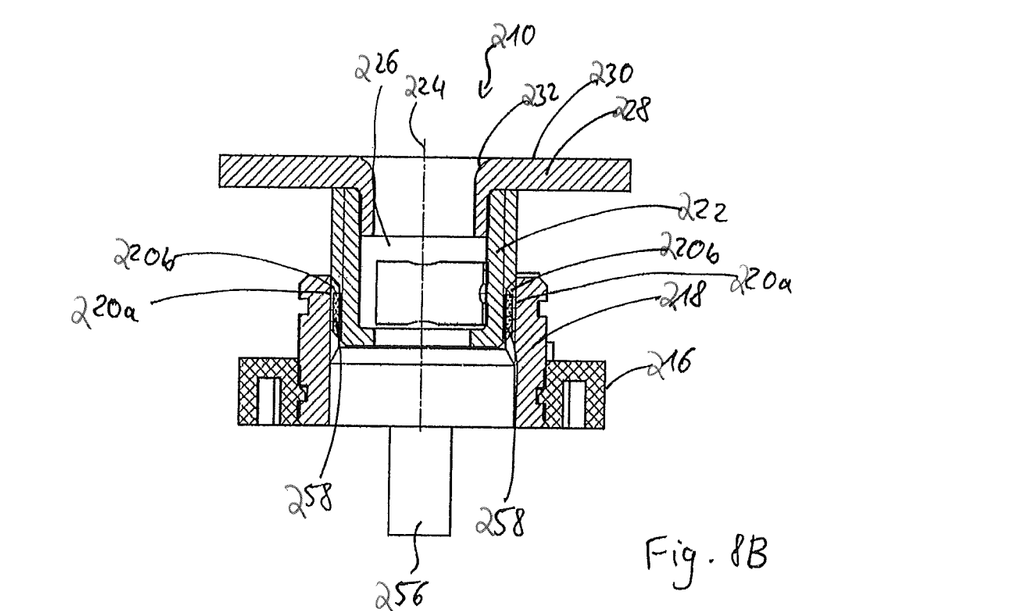
FIG. 8B a side sectional view of the tolerance compensation apparatus of FIG. 7 with a compensation element in the compensation position.

If the compensation element is brought, starting from the starting position shown in FIG. 8a, by rotation relative to the base element 218 into the compensation position shown in FIG. 8b, the adhesive 258 is drawn into the internal thread 220a of the base element 218. In this respect, the microcapsules are broken open and the two components of the adhesive 258 can be mixed. After the hardening of the mixed adhesive components, the compensation element 222 is secured against a rotation relative to the base element 218 and is thus fixed in its compensation position.

REFERENCE NUMERAL LIST 10 tolerance compensation apparatus
12 snap-in nut
14 fastening hook
16 fastening ring 18 base element
20a internal thread
20b external thread
22 compensation element
24 central longitudinal axis
26 drive spring
28 contact ring
30 contact surface
32 central passage
34 fixing housing
36 securing lug
38 cut-out
40 fixing wedge
42 guide section
44 ring-shaped section
46 opening
48 end
50 wedge-shaped section
52 toothed arrangement
54 connection element
56 latching clip
58 adhesive
60 ring gap

The invention claimed is:

1. An apparatus (10) for compensating tolerances between components to be screwed to one another, comprising
a hollow-cylindrical base element (18); and
a hollow-cylindrical compensation element (22), said hollow-cylindrical compensation element being in threaded engagement with the base element (18) and being able to be moved from a starting position into a compensation position by rotation relative to the base element (18),
the apparatus further comprising two fixing wedges (40, 58) by means of which the compensation element (22) can be fixed relative to the base element (18) in the compensation position,
the two fixing wedges being arranged in parallel to one another such that they are in clamping engagement with the compensation element (22) in the fixing position on oppositely disposed sides of the compensation element (22), wherein the fixing wedges (40) each have a substantially rectangular cross-section and taper toward a front end, whereby a wedge-shaped section is formed,
a fixing housing attached to the base element (18), with the fixing wedges (40) being arranged displaceable in the fixing housing (34).

2. The apparatus (10) in accordance with claim 1, wherein the fixing wedges (40, 58) are configured to secure the compensation element (22) against a rotation relative to the base element (18).

3. The apparatus (10) in accordance with claim 1, wherein the fixing wedges (40, 58) fix the compensation element (22) relative to the base element (18) by means of at least one of a material continuity and friction locking.

4. The apparatus (10) in accordance with claim 1, wherein the fixing wedges (40, 58) can be moved out of a position of rest into a fixing position.

5. The apparatus (10) in accordance with claim 4, further comprising securing means (52) for securing the fixing wedges (40) in the fixing position.

6. The apparatus (10) in accordance with claim 1, wherein the fixing wedges (40) are connected to one another by a connection element (54).

7. The apparatus (10) in accordance with claim 6, wherein the connection element is formed in one piece with the fixing wedges (40).

8. The apparatus (10) in accordance with claim 1, wherein the fixing wedges (40) are connected to one another by a connection element (54), said connection element extending at a right angle to the fixing wedges (40).

9. The apparatus (10) in accordance with claim 8, wherein the connection element is formed in one piece with the fixing wedges (40).

10. The apparatus (10) in accordance with claim 1, wherein the fixing wedges (40, 58) each have a toothed arrangement (52) and the fixing housing (34) has a latch projection which engages into the toothed arrangement for securing the fixing wedges (40, 58) in the fixing position.

* * * * *